US007971445B2

(12) United States Patent
Zwicker

(10) Patent No.: US 7,971,445 B2
(45) Date of Patent: Jul. 5, 2011

(54) CABLELESS AIR CONDITIONER CONTROL SYSTEM AND METHOD

(75) Inventor: Ryan D. Zwicker, New Braunfels, TX (US)

(73) Assignee: Vintage Air, Inc., San Antonio, TX (US)

( * ) Notice: Subject to any disclaimer, the term of this patent is extended or adjusted under 35 U.S.C. 154(b) by 834 days.

(21) Appl. No.: 11/903,883

(22) Filed: Sep. 25, 2007

(65) Prior Publication Data

US 2008/0073071 A1 Mar. 27, 2008

Related U.S. Application Data

(60) Provisional application No. 60/846,990, filed on Sep. 25, 2006.

(51) Int. Cl.
*B60H 1/32* (2006.01)
*F25D 19/00* (2006.01)

(52) U.S. Cl. ........................................... 62/244; 62/298

(58) Field of Classification Search .................... 62/244, 62/298; 236/51, 94; 74/469, 473.3; 165/11.1
See application file for complete search history.

(56) References Cited

U.S. PATENT DOCUMENTS

| | | | | |
|---|---|---|---|---|
| 4,237,967 | A * | 12/1980 | Harding et al. | 62/323.1 |
| 5,156,049 | A * | 10/1992 | Douglas | 345/184 |
| 5,341,868 | A * | 8/1994 | Nakata | 62/161 |
| 5,563,519 | A * | 10/1996 | Honkanen | 324/676 |
| 5,791,981 | A | 8/1998 | Drobner | |

FOREIGN PATENT DOCUMENTS

EP 1707410 A1 4/2006

OTHER PUBLICATIONS

ARA Installation.
Instructions, May 1981.

* cited by examiner

*Primary Examiner* — Frantz F Jules
*Assistant Examiner* — Daniel C Comings

(57) ABSTRACT

A cableless control system for an automobile air conditioner includes a slide pot potentiometer assembly for connection to an actuator arm on the back of a dashboard mounted control assembly. The position of the slide pot potentiometer assembly creates an electrical resistance signal which governs the position of the devices which moves the variable mechanical portions of the automobile air conditioner. The shape of the linear slide pot potentiometer assembly allows for the use of existing hardware and eliminates the need to run sheathed cables from the dashboard mounted control panel assembly to the mechanically variable portions which govern the operation of the automobile air conditioner.

14 Claims, 8 Drawing Sheets

CABLELESS AIR CONDITIONER CONTROL SYSTEM AND METHOD

CROSS REFERENCE TO RELATED APPLICATION

This application claims the benefit of Provisional U.S. Patent Application No. 60/846,990 filed Sep. 25, 2006.

STATEMENT REGARDING FEDERALLY FUNDED RESEARCH AND DEVELOPMENT

The invention described in this patent application was not the subject of federally sponsored research or development.

FIELD

The system and method of the present invention pertains to automobile air conditioners; more particularly, the system and method of the present invention pertains to control systems for automobile air conditioners.

BACKGROUND

Air conditioners have become standard equipment on many automobiles. In particular, air conditioners have become standard equipment on automobiles sold in that part of the United States where warm weather is prevalent. However, despite the almost ubiquitous presence of air conditioners in modern automobiles, the inclusion of air conditioners as standard equipment in automobiles is a relatively recent phenomenon when compared to the long history of the automobile. Specifically, for the first five decades of the 20$^{th}$ century most automobile manufacturers did not offer air conditioners even as optional accessory equipment. In the 1950's, about the time when automobile electrical systems switched from 6-volt systems to 12-volt systems, automobile manufacturers began to offer air conditioners as an expensive accessory item. However, because of the cost, many car buyers did not purchase an air conditioner as an on-board accessory item when purchasing a new car.

The lack of air conditioners in many older automobiles has created an interesting dilemma for those automobile hobbyists interested in rebuilding, restoration or modification of older automobiles manufactured during the 20$^{th}$ century. The dilemma is that those desiring to enjoy the feeling of driving a restored older automobile must often do so without an air conditioner. This dilemma is also experienced by those automobile hobbyists interested in the building of "hot rods," "street rods" or "custom cars" using 20$^{th}$ century automobiles that did not come from the factory with an on-board air conditioner as an accessory item.

Out of the dilemma of not having air conditioners for older 20$^{th}$ century automobiles has arisen an industry which provides air conditioning system kits for old cars, rebuilt automobiles, restored automobiles, hot rods, street rods and custom cars. These air conditioning system kits for old cars, rebuilt automobiles, restored automobiles, hot rods, street rods and custom cars include all of the basic components found in a modern automobile air conditioning system such as an engine-driven compressor, a condensor and an evaporator such as shown in FIG. 1. Also included but not shown FIG. 1 is an adjustable speed blower or fan for controlling the velocity of reduced temperature ambient air blown unto the passenger compartment of the vehicle through ducts and vents. A special control panel accessible to the occupants of the vehicle is typically mounted on or under the dashboard for controlling the operation of the components shown in FIG. 1 as well as the blower. Newer air conditioning system kits for older cars may include small rotary, linear or step motors or other devices providing mechanical movements which are used to provide the force necessary to move those portions of an automobile air conditioning system such as valves and vents which require a mechanical motion to adjust their operational settings.

Some old car hobbyists are purists and object to the use of anything different on the dashboards of their vehicles from what was originally installed on the older automobile. Specifically, these old car hobbyists desire to use the original equipment control panel mounted either onto or under the dashboard to control the air conditioner. Other old car hobbyists insist on the use of the original ventilation control panel that came with the automobile when it rolled off the production line even if the original ventilation control panel made no provision for the use of an air conditioner. If a modern aftermarket air conditioner is used, the desire to use the original manual controls presents two difficult problems for the old car hobbyist. The first problem is the direction of the movement of the manual control with respect to the markings on the ventilation control panel as seen by the occupants of the vehicle. The second problem is the length of mechanical control movement; particularly, the length of the mechanical control movement for adjusting temperature.

Further complicating the installation of an air conditioning system into an old car that did not have an air conditioner as original equipment are the manually operated sheathed Bowden-style control cables. The sheathed Bowden-style manually operated control cables typically run from the back or unseen portion of the dashboard mounted control panel assembly to the various valves, vents and components which govern the operation of an automobile air conditioner. One problem is assuring a proper length for the manually operated Bowden-style control cables which are attached to the actuator arms on the back of the dashboard mounted control panel assembly. Another problem is the appearance and mounting of the Bowden-style cables themselves. Many old car hobbyists who take their handiwork to competitive car shows strive to attain a clean uncluttered appearance of the engine compartment which is free of any type of control cables or control cable mounting brackets.

Accordingly, a need remains in the art for a system and method that will allow air conditioners to be placed in older cars. Such system must both eliminate the use of manually operated Bowden-style control cables; but, where possible, enable utilization of existing dashboard mounted control panel assemblies. Further, such system and method should be adaptable for connection and mounting to an existing dashboard mounted control panel assembly without the need to modify the existing dashboard mounted control panel assembly.

SUMMARY

The system and method of the present invention enables the elimination of manually operated Bowden-style control cables with air conditioners placed in older cars while at the same time providing for the utilization of existing dashboard mounted control panel assemblies. Further, the system and method of the present invention enables both connection and mounting to an existing dashboard mounted control panel assembly without the need to modify or use special hardware to adapt the existing dashboard mounted control panel assembly for use with the automobile air conditioner.

The key component of the preferred embodiment of the system and method of the present invention is a linear slide pot potentiometer assembly. The disclosed linear slide pot potentiometer assembly may be connected to the back of an existing dashboard-mounted control panel assembly using existing hardware and without the need to modify the appearance or operation of the existing dashboard mounted control panel assembly.

Movement of a manual control arm which is accessible to the occupants of the vehicle moves an actuator arm on the back of the prior art dashboard mounted control panel assembly. However, instead of causing movement within a Bowden-style cable, according to the present invention, a movable spring biased conductor is moved within the linear slide pot potentiometer assembly mounted behind the dashboard mounted control panel assembly.

The linear slide pot potentiometer assembly includes housing. It is the mechanical movement of the spring biased conductor against a stationary conductor positioned within and affixed to the housing which provides an electrical signal to an electronic control module. The electronic control module is connected to small rotary, linear or step motors or other similar devices which provide the mechanical motion required to control the operation of the automobile air conditioner. Specifically, it is an electrical signal representative of the electrical resistance related to the position of the movable and stationary conductors within the linear slide pot potentiometer assembly which is sent to an analog or digital control system. This electrical signal regulates the operation of the various valves, vents, and mechanical components in the automobile air conditioner. Accordingly, by use of the disclosed system and method, the need to run Bowden-style cables from the actuator arms on the back of a dashboard mounted control panel assembly to the various valves, vents and mechanical components which make up an automobile air conditioner is eliminated.

The use of a linear slide pot potentiometer assembly, which is constructed and arranged for direct attachment to the actuator arms located behind a dashboard mounted control panel, at the same place where the Bowden-style cables connected to the actuator arms and connected to the frame where the original cable sheathes were attached, provides a key feature heretofore unavailable to those installing automobile air conditioners in older cars. According to the present invention the linear slide pot potentiometer assembly can be used without regard to either the direction of travel or the length of travel of the manual controls in the dashboard mounted control panel assembly. Accordingly, the direction of travel or the length of travel of the manual controls in the dashboard mounted control panel assembly is no longer a problem for the old car hobbyist seeking to place an air conditioning system in a restored or modified older car.

BRIEF DESCRIPTION OF THE DRAWING FIGURES

A still better understanding of the cableless air conditioner control system and method of the present invention may be had by reference to the drawing figures wherein.

DESCRIPTION OF THE EMBODIMENTS

Figure 1:
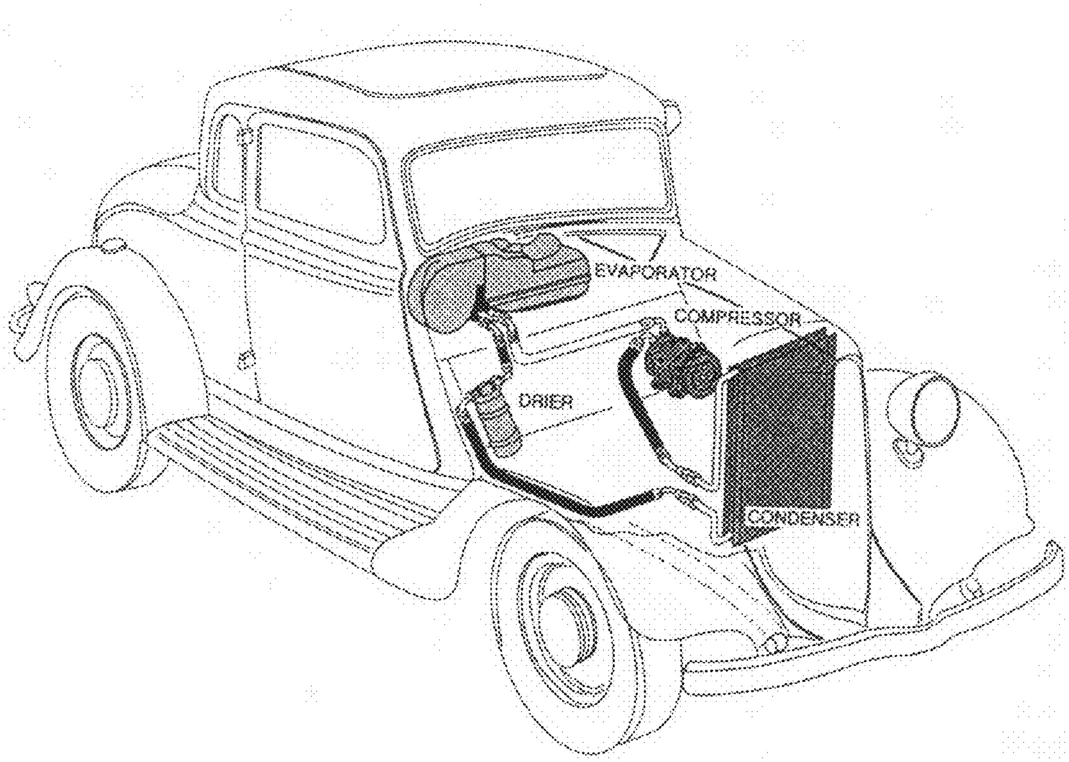
Fig. 1 (PRIOR ART)
FIG. 1 is an illustration of the components of a prior art air conditioner in a 1930's automobile taken from the book *How To Air Condition Your Car* by Timothy Remus and Jack Chisenhall published in 1993.
Figure 2:
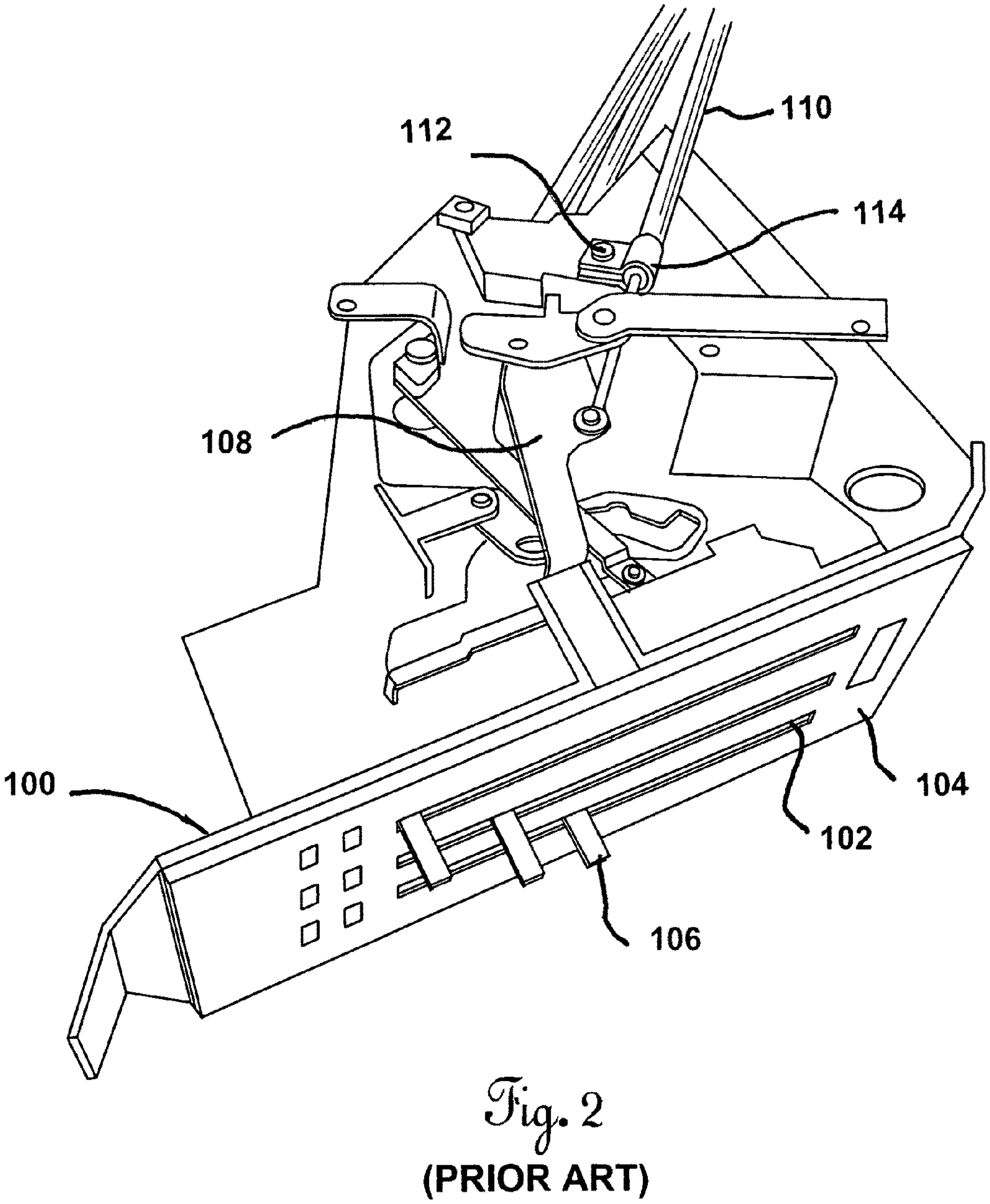
Fig. 2 (PRIOR ART)
FIG. 2 is a perspective view of the rear of a prior art dashboard mounted control panel assembly with two sheathed Bowden-style cables attached to the actuator arms behind the dashboard mounted control panel assembly.

As best seen in FIG. 2, a prior art dashboard mounted control panel assembly 100 is shown removed from the dashboard of an older automobile. Within slots 102 of the face plate portion 104 of the dashboard mounted control assembly 100 are included one or more sliding manual controls 106. The sliding manual controls 106 are positioned to move along a substantially linear vertical or a substantially horizontal path to enable the occupant of a vehicle to control the temperature of the interior portion of an automobile. In the illustrated example the sliding manual controls 106 move one or more actuator arms 108 which are attached to sheathed Bowden-style cables 110. These sheathed Bowden-style cables 110 may control the position of an air inlet door (not shown) to select the use of either inside or outside air or an air outlet door (not shown) for directing air flow with respect to an air conditioner evaporator.

The prior art dashboard mounted control panel assembly 100 shown in FIG. 2 may be one that was available for installation as an accessory on an older automobile or an assembly for an older car that did not have any provision for control of an automobile air conditioner. Because the old car hobbyist working with a rebuilt automobile, a restored automobile, a hot rod, a street rod, or a custom car now desires to add an air conditioner, most old car hobbyists, particularly purists, desire to use the dashboard mounted control panel assembly 100 that was originally offered with their older automobile.

As explained above, the installation of an air conditioner into an automobile that did not originally have an air conditioner typically involves running one or more Bowden-style control cables 110 from the actuator arms 108 on the back of the dashboard mounted control panel assembly 100 to the various valves, vents and mechanical controls (not shown) which are typically part of an automobile air conditioning system.

Figure 4:
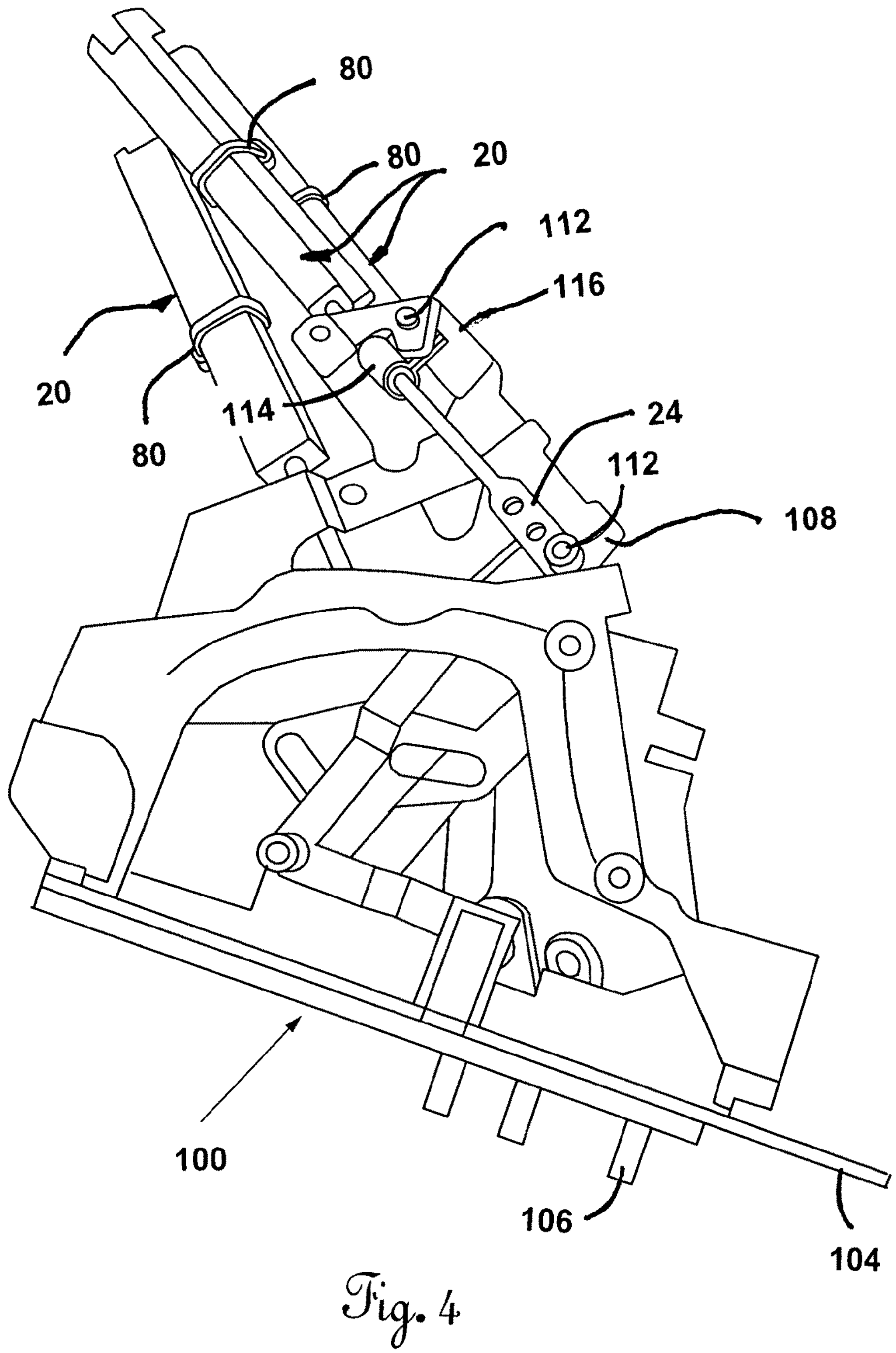
FIG. 4 is a top plan view of the dashboard mounted control panel assembly shown in FIG. 3.
Figure 5:
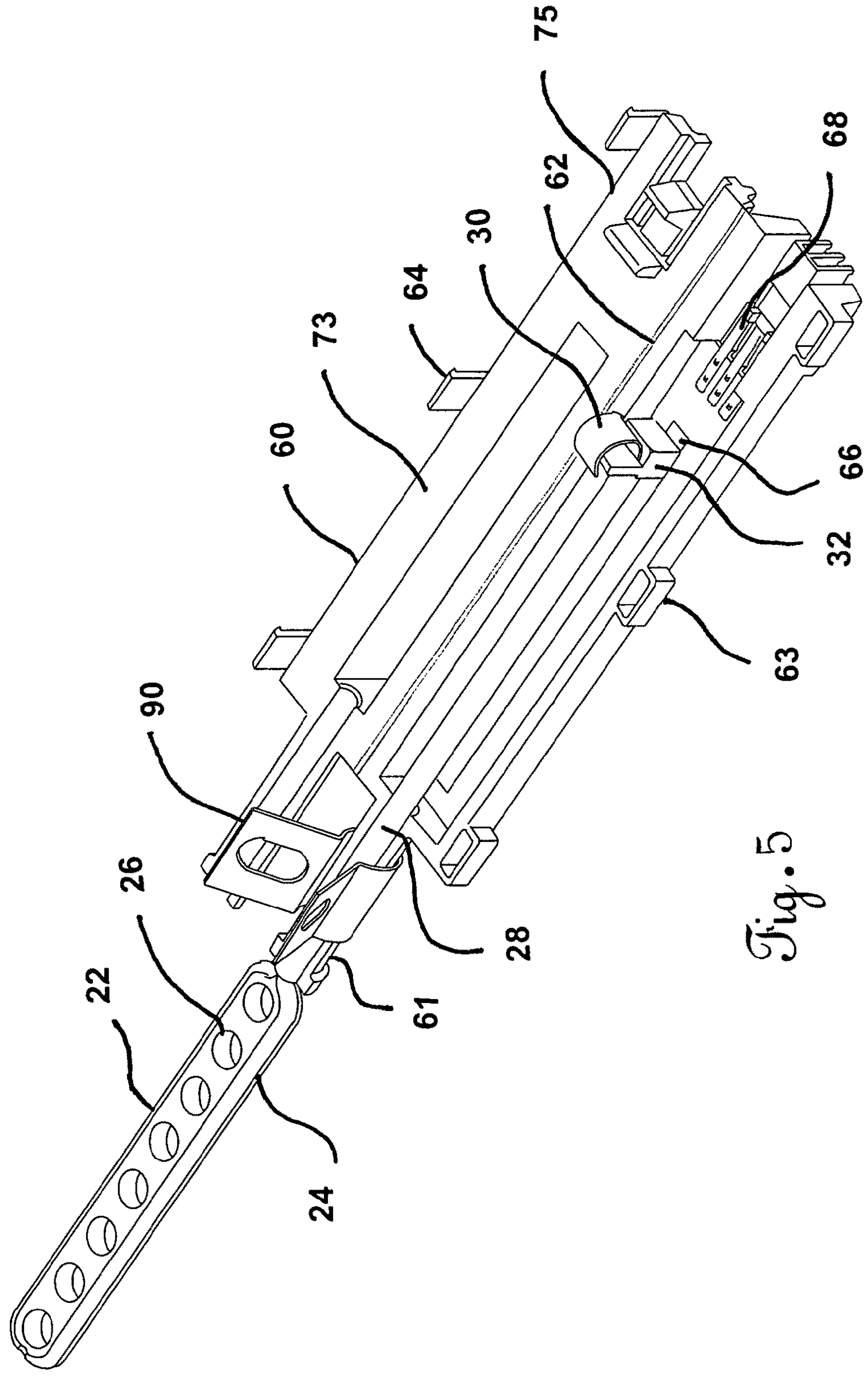
FIG. 5 is a perspective view of the inside of the linear slide pot potentiometer assembly shown in FIG. 3 and in FIG. 4 with the housing portion opened.
Figure 6A:
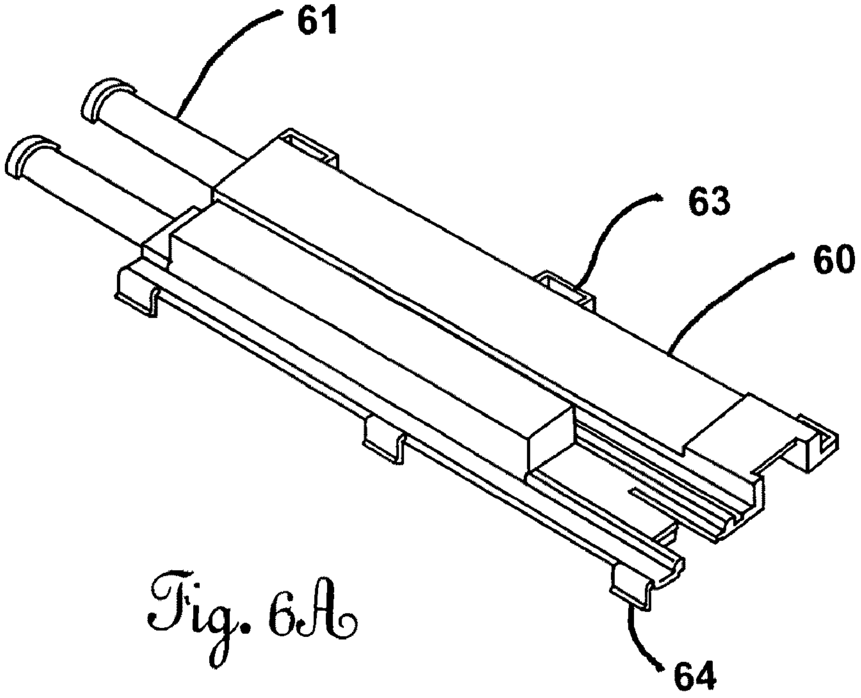
FIG. 6A is a perspective view of the outside of the housing portion shown in FIG. 5A.
Figure 6B:
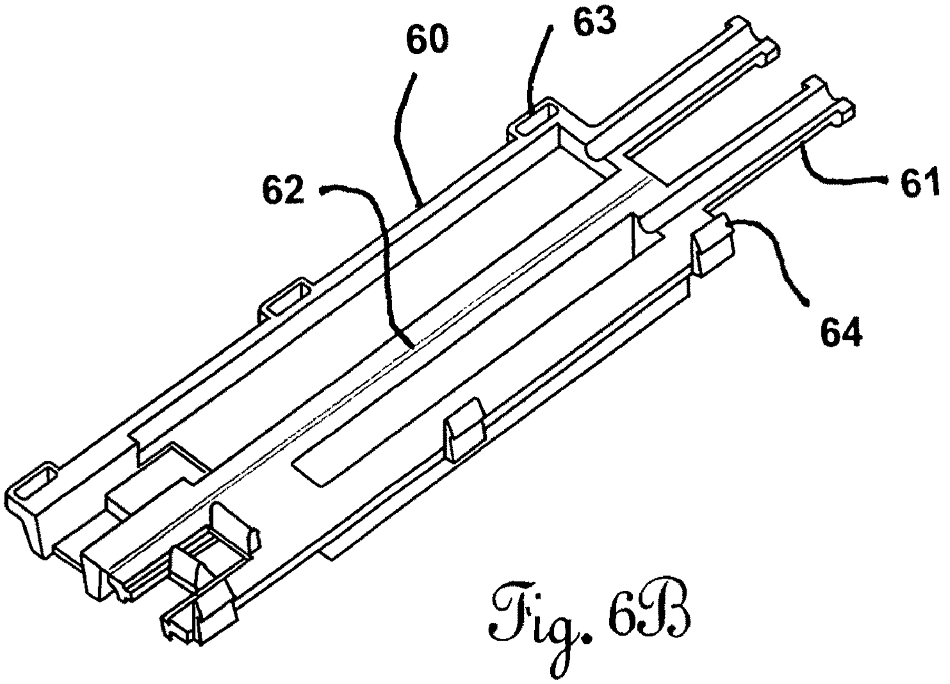
FIG. 6B is a perspective view of the inside of the housing portion shown in FIG. 6A.
Figure 7A:
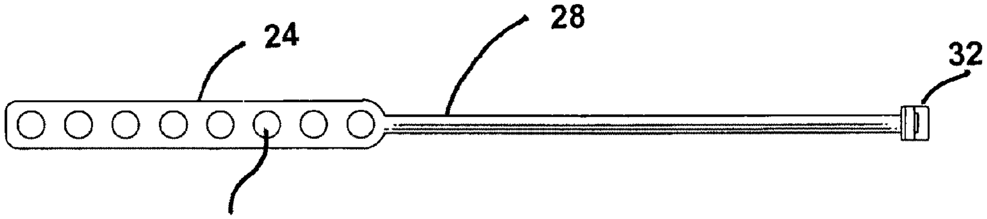
FIG. 7A is a top plan view of the movable spring biased electrical conductor.
Figure 7B:
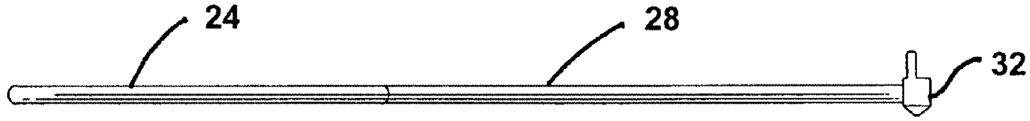
FIG. 7B is a side elevational view of the movable spring biased electrical conductor shown in FIG. 7A.

As shown in FIG. 4 and FIG. 5, by use of the disclosed invention, the sheathed Bowden-style cables which are an essential part of a prior art automobile air conditioner may be removed.

Replacing the prior art Bowden-style cables 110 cables used on a prior art automobile air conditioner is a set of one or more linear slide pot potentiometer assemblies 20. As may be seen in FIG. 4 and FIG. 5 showing the attachment of the linear slide pot potentiometer assemblies 20 to the actuator arms 108 back of the prior art dashboard mounted control panel assembly 100, the linear slide pot potentiometer assemblies 20 are attachable to the existing Bowden-style cable mounting points 112 originally used on the prior art dashboard mounted control panel assembly 100. Thus, in most cases, no modification to the actuator arms 108 extending from the rear portion of the existing dashboard mounted control panel assembly 100 is needed. Further, each linear slide pot potentiometer assembly 20 is held in position by a clamp 114. The clamp 114 attaches the linear slide pot potentiometer assembly 20 to a bracket 116 generally available on the back of most dashboard mounted control panel assemblies 100. Thus, an important advantage of the disclosed system and method is that in most applications, no new mounting hardware needs to be constructed as the linear slide pot potentiometer assemblies 20 can be mounted satisfactorily using the same hardware previously used to mount the sheathed Bowden-style cable assemblies 110.

As may be seen in FIG. 5, the construction and operation of the linear slide pot potentiometer assembly 20 of the present invention resembles that of a syringe. A movable spring biased electrical conductor 22, as shown in FIG. 5, extends from an openable housing 60. The flattened portion 24 of the movable spring biased electrical conductor 22 is mechanically connected to the end of one of the movable actuator arms 108 on the back of the dashboard mounted control panel assembly 100 using one of a plurality of holes 26 as shown in FIG. 5.

Figure 3:
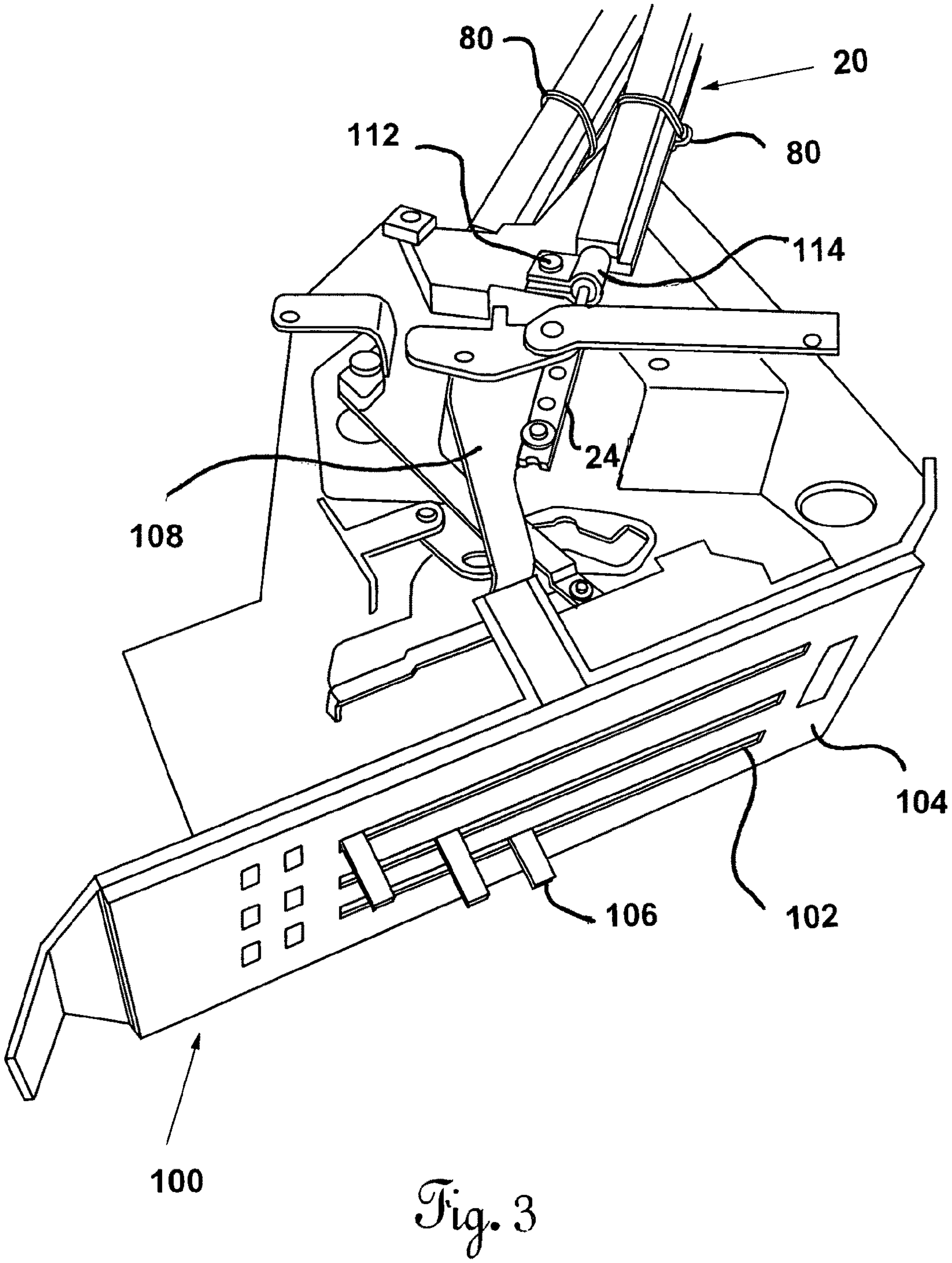
FIG. 3 is an enlarged perspective view of a dashboard mounted control panel assembly showing the attachment of two cableless controls, according to the present invention, to the actuator arms behind the dashboard mounted control panel assembly.

At the end 61 of the openable housing 60 where the rod portion 28 of the movable conductor 22 enters the housing 60 is a clamp 90. The clamp 90 attaches the openable housing 60 to a bracket or some other stationary mounting on the back of the prior art dashboard mounted control assembly 100. The clamp originally used with the sheathed Bowden-style cables 110 may be used in most installations. The openable housing 60 includes a hinge line 62 so that when folded and the side clips 64 engage the openings 66, the openable housing 60 snaps shut and encloses around the substantially cylindrical rod portion 28 of the movable conductor 22. As may be seen in FIG. 3 and in FIG. 4, an optional band 80 has been added to assure the openable housing 60 remains closed. On top of the movable conductor 22 is spring 30. Spring 30 contacts the inside 73 of the top 75 of the openable housing 60 and is used to bias a foot 32 on the end of the rod portion 28 of the movable conductor 22 against a stationary linear conductor 66 within the openable housing 60. The stationary linear conductor 66 is a substantially flat conductor affixed to the openable housing 60. Electrical connections 68 connected to the end of the stationary linear conductor 66 convey an electrical signal indicative of the electrical resistance related to the physical position of the foot 32 with respect to the stationary linear conductor 66. This electrical signal which is indicative of the physical position of the foot 32 on the stationary linear conductor 66 is then sent to an analog or digital control system. In the preferred embodiment, the electrical signal is sent to the software portion of a digital control system as described below. The software system uses this electrical signal to mechanically position the various valves, vents, and mechanical components which control the operation of the automobile's air conditioner.

Figure 8A:
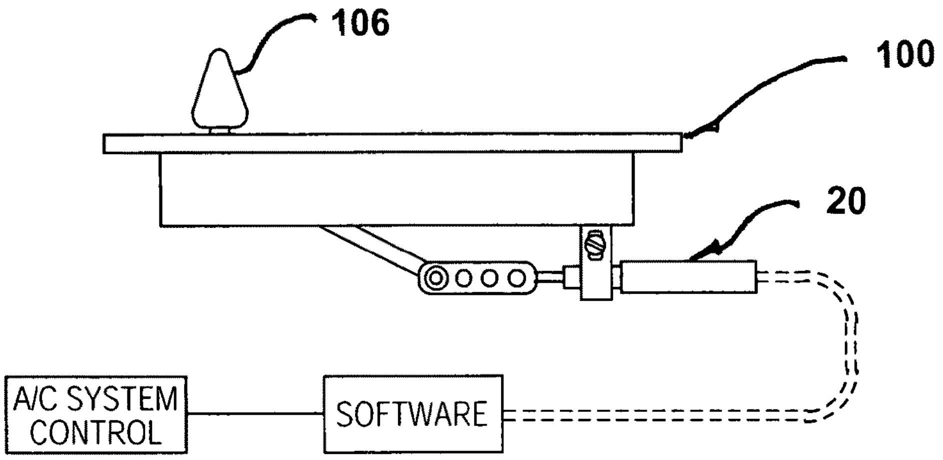
FIG. 8A is a first schematic illustrating the first step in the matching of the travel of the linear slide pot potentiometer assembly to an existing dashboard mounted control panel assembly.
Figure 8B:
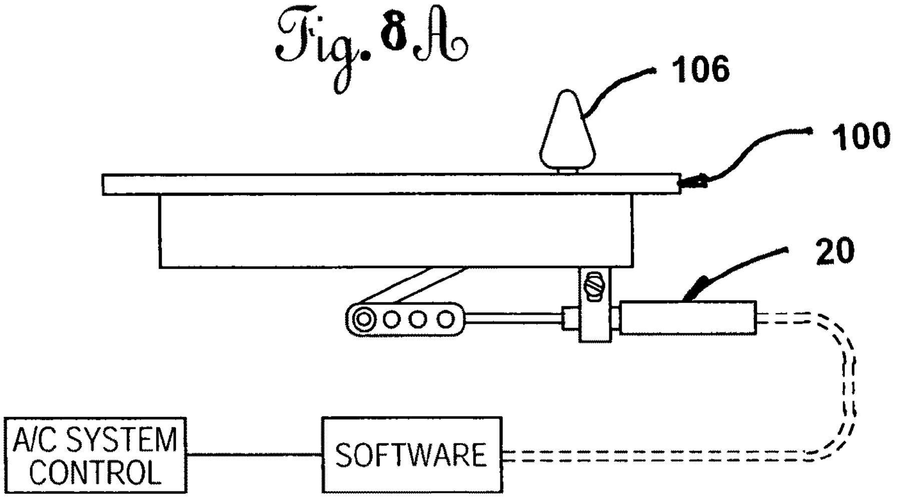
FIG. 8B is a second schematic illustrating the second step in the matching of the travel of the linear slide pot potentiometer assembly to an existing dashboard mounted control panel assembly.
Figure 8C:
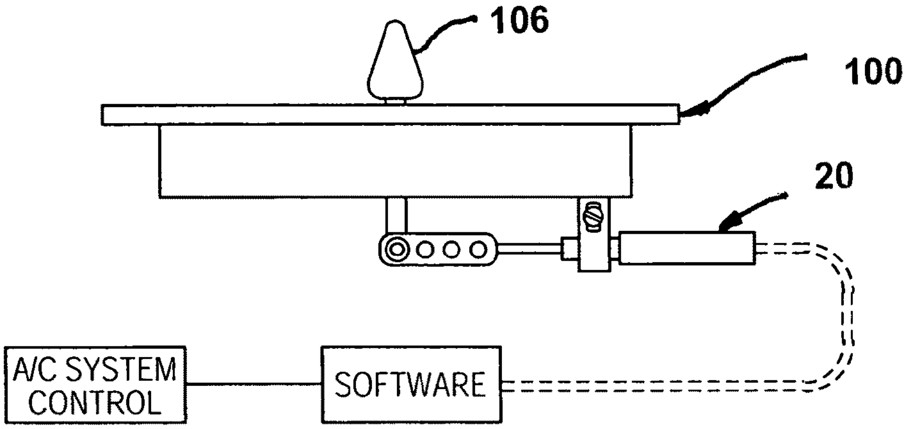
FIG. 8C is a third schematic of the result obtained when the travel of the linear slide pot potentiometer assembly has been properly matched to an existing dashboard mounted control panel assembly.

An additional feature of the linear slide pot potentiometer assembly 20 of the present invention is that both the direction of movement and the length of the movement of the foot 32 against the stationary linear conductor 66 may be recorded and divided into set of uniform gradations using a software system as described with respect to FIGS. 8A, 8B, and 8C.

As shown in FIG. 8A an old car hobbyist installing an automobile air conditioning system including the linear slide pot potentiometer assembly 20 of the present invention can physically set a control to a position marked "COLD" or "COOL" on the dashboard mounted control panel assembly 100 then electrically mark the physical position of the foot 32 against the stationary linear conductor 66 in the software portion of the electronic controls for the automobile air conditioning system.

As shown in FIG. 8B, the automobile hobbyist can do the same thing at the opposite end of the manual control travel marked either "WARM" or "HOT". Once again, the physical position of the foot 32 with respect to the stationary linear conductor 66 will be electrically marked in the software portion of the electronic controls for the automobile air conditioning system.

The software portion of the electronic controls for the automobile air conditioning system will then create a substantially linear gradient of positions between the marked positions at either end of the manual control travel. The result is that irrespective of the length of travel or the direction of travel of the manual temperature control on the dashboard mounted control assembly the linear slide pot potentiometer assembly 20 will have created a range of temperature control positions matching the length of travel and the direction of travel of the manual control 106 in dashboard mounted control panel assembly 100. Thus, as shown in FIG. 8C, a range of temperature settings between the "COLD" or "COOL" position and the "WARM" or "HOT" position is automatically established. For example, the temperature provided by the setting shown in FIG. 8C will be substantially halfway between the two temperatures at the extreme end settings.

Those of ordinary skill in the art will understand that while a linear slide pot potentiometer assembly 20 has been disclosed for use in the preferred embodiment, still other forms of variable electrical controls, also well known to those of ordinary skill in the art as position transducers, may be used. Such other forms of variable electrical controls may include an encoder, an array of switches or a substantially continuous switch where a signal is transmitted by wire to the air conditioning system. Alternatively, a wireless RF system may be used where the position of the panel mounted air conditioner control assembly is put into the form of an electrical signal transmitted wirelessly to the software portion of the electronic controls for the automobile air conditioning system. Software, similar to that disclosed in the preferred embodiment of the disclosed system and method, will enable the controls to be adapted for the direction of travel and the length of travel of the manual control.

Still others or ordinary skill in the art will understand that the linear slide pot potentiometer assembly 20 used in the disclosed system has few components and may be produced significantly more inexpensively than many more precise linear potentiometers currently available. Accordingly, the simple, inexpensive disclosed linear slide pot potentiometer assembly may be constructed and arranged for use in a wide variety of systems where a linear potentiometer is employed but the control accuracy needed is not extremely precise.

While the disclosed cableless air conditioner control system and method has been described according to its preferred and alternate embodiments, other modifications will become apparent to those of ordinary skill in the art. Such modifications shall be included within the scope and meaning of the appended claims.

What is claimed is:

1. A cableless control system for an automobile air conditioner, said automobile air conditioner having a dashboard mounted control panel assembly including one or more manual controls accessible to an occupant of the automobile and one or more actuator arms originally designed for the movement of cables, said actuator arms being responsive to the movement of the one or more manual controls, said cableless control system comprising:

a housing constructed and arranged to be mountable to the dashboard mounted control panel assembly where one or more cable sheathes were originally attached;

a variable electrical control contained within said housing and mechanically connected to the one or more actuator arms where the cables where originally attached;

said variable electrical control constructed and arranged to produce a signal usable to govern the operation of the automobile air conditioner upon the movement thereof;

means for electrically marking the operational parameters for the manual controls on the control panel assembly based on said signal.

2. The cableless control system for an automobile air conditioner as defined in claim 1 wherein said variable electrical control includes:

a stationary electrical conductor contained within said housing;

a movable spring biased electrical conductor constructed and arranged to be movable within said housing and positionable with respect to said stationary electrical conductor;

said movable spring biased electrical control being further constructed and arranged to be connected to and moved by an actuator arm;

whereby movement of said movable spring biased electrical control with respect to said stationary electrical control will provide an electrical signal to the automobile air conditioner.

3. The cableless control system for an automobile air conditioner as defined in claim 1 wherein said variable electrical control is selected from a group consisting of an encoder, a switch array, a substantially continuous switch or an RF system.

4. The cableless control system for an automobile air conditioner as defined in claim 1 wherein said operational parameters include:

the travel limits of an actuator arm;

the direction of travel of the actuator arm; and the length of travel of the actuator arm.

5. An automobile air conditioning system constructed and arranged for use on a vehicle not originally equipped with an air conditioner or for use on a vehicle whose air conditioner was controlled by the movement of cables attached to a control panel, said automobile air conditioning system comprising:

an air conditioning compressor, an air conditioning condenser, an air conditioning evaporator and a blower to controllably reduce the temperature of the ambient air within the passenger compartment of the automobile;

a system of ducts and vents to direct said reduced temperature air into the passenger compartment of the automobile at a predetermined velocity and temperature;

a control system for regulating the operation of said air conditioning compressor, said air conditioning condenser, said air conditioning evaporator, and said blower to enable the occupants of the automobile to regulate the velocity and temperature of air entering the passenger compartment of the automobile, said control system including:

a control panel assembly including mechanical controls movable by said occupants of said automobile wherein movement of said mechanical controls results in movement of actuator arms located on the back of said control panel assembly;

said movement of said actuator arms produces a signal which governs the operation of the automobile air conditioner upon movement thereof;

a housing constructed and arranged to be mountable to said control panel assembly where one or more cable sheathes were originally attached;

a stationary electrical conductor contained with said housing;

means for electrically marking the operational parameters for the manual controls on the control panel assembly based on said signal;

a movable spring biased electrical conductor constructed and arranged to be movable within said housing and in positionable contact with said stationary electrical conductor;

said movable spring biased electrical conductor constructed and arranged to be connected to and movable by one of said actuator arms.

6. The automobile air conditioning system as defined in claim 5 wherein said software system establishes signals for establishing the limits of travel of said actuator arm, the direction of travel of said actuator arm and the length of travel of said actuator arm.

7. The automobile air conditioning system as defined in claim 6 wherein said software system also establishes uniform gradations of the length of travel of said actuator arm between said limits of travel of said actuator arm.

8. A system for converting a cable operated automobile air conditioner to a cableless automobile air conditioner wherein said cable operated automobile air conditioner includes manual controls movable on one end by an occupant of the automobile, a face plate providing instructions for an occupant of the automobile regarding the results to be obtained from the movement of the manual controls, a housing behind the face plate for mounting and controlling the movement of the manual controls, and a connector for mounting and positioning cable assemblies attached to the opposite end of the manual controls for providing mechanical inputs for the operating components of the automobile air conditioner, said system comprising:

a slide pot potentiometer assembly including:

a housing constructed and arranged to be mounted to the housing behind the face plate using the connector for mounting and positioning a cable assembly;

a stationary electrical conductor positioned within said housing;

a movable electrical conductor constructed and arranged for slidable movement within said housing to be in positionable contact with respect to said stationary electrical conductor, said movable electrical conductor being positionable by connection to the end of the manual controls;

said slide pot potentiometer assembly being electrically connected to a system for mechanically actuating the operating components of the automobile air conditioner; and the system further comprising means for electrically marking the operational parameters for the manual controls based on the position of said movable electrical conductor.

9. A method for converting a cable operated automobile air conditioner to a cableless air conditioner wherein said cable operated air conditioner includes manual controls movable on one end by an occupant of the automobile, a face plate providing instructions for an occupant of the vehicle regarding the results to be obtained from the movement of the manual controls, a housing behind the face plate for mounting and controlling the movement of the manual controls, and a connector for mounting and positioning cable assemblies attached to the opposite end of the manual controls for providing mechanical inputs for the operating components of the automobile air conditioner, said method comprising the steps of:

attaching a slide pot potentiometer assembly to an end opposite the end that is movable by the occupant of the manual controls;

said slide pot potentiometer assembly including:

a housing constructed and arranged to be mounted behind the face plate using the connector for mounting and positioning a cable assembly;

a stationary electrical conductor positioned within said housing;

a movable electrical conductor constructed and arranged for slidable movement within said housing to be in positionable contact with respect to said stationary electrical conductor, said movable electrical conductor being positionable by connection to the opposite end of the manual controls;

connecting said slide pot potentiometer assembly to a system for mechanically actuating the operating components of the automobile air conditioner; and electrically marking the operational parameters for the manual controls based on the position of said movable electrical conductor.

10. The method as defined in claim 9 wherein said slide pot potentiometer produces a resistance signal representative of the position of said movable electrical conductor with respect to said stationary electrical conductor and said resistance signal is conducted to the software portion of a digital control system.

11. The method as defined in claim 10 wherein said electrical resistance signal is used to record the extreme positions of the manual controls.

12. The method as defined in claim 10 wherein said electrical resistance signal is used to record the length of travel of the manual controls.

13. The method as defined in claim 10 wherein said electrical resistance signal is used to record the direction of travel of the manual controls.

14. The method as defined in claim 11 wherein said software portion of a digital control system creates uniform gradations between said extreme positions of the manual controls.

* * * * *